Figure 1:
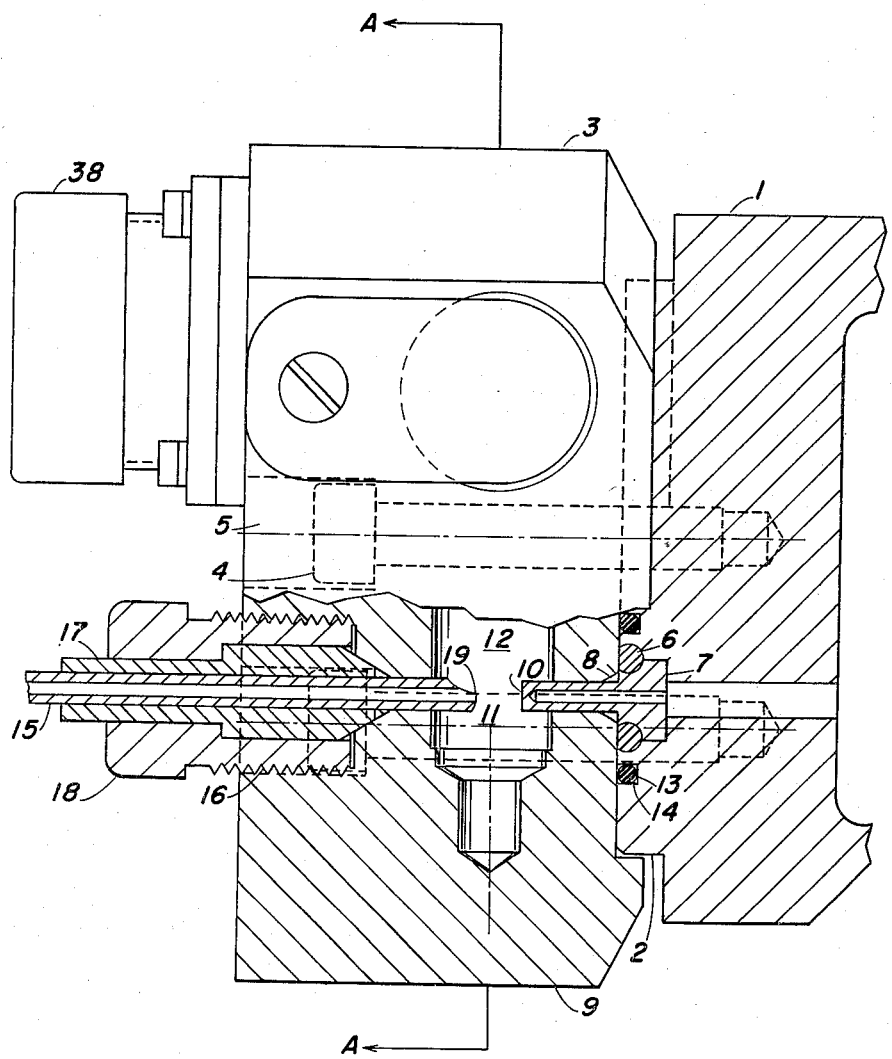

May 24, 1960

L BRUCE WILNER 2,937,654

TUBE SHEARING VALVE

Filed Feb. 10, 1958

3 Sheets-Sheet 1

WITNESSES:
Roy H. Smith, Jr.
Henry Hayman

INVENTOR.
L. Bruce Wilner
BY
Roland G. Anderson
attorney

May 24, 1960
L BRUCE WILNER
2,937,654
TUBE SHEARING VALVE
Filed Feb. 10, 1958
3 Sheets-Sheet 2
Fig. 2a
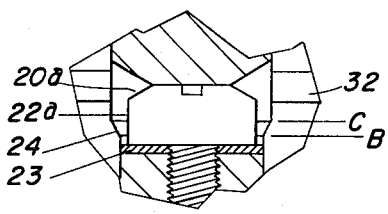
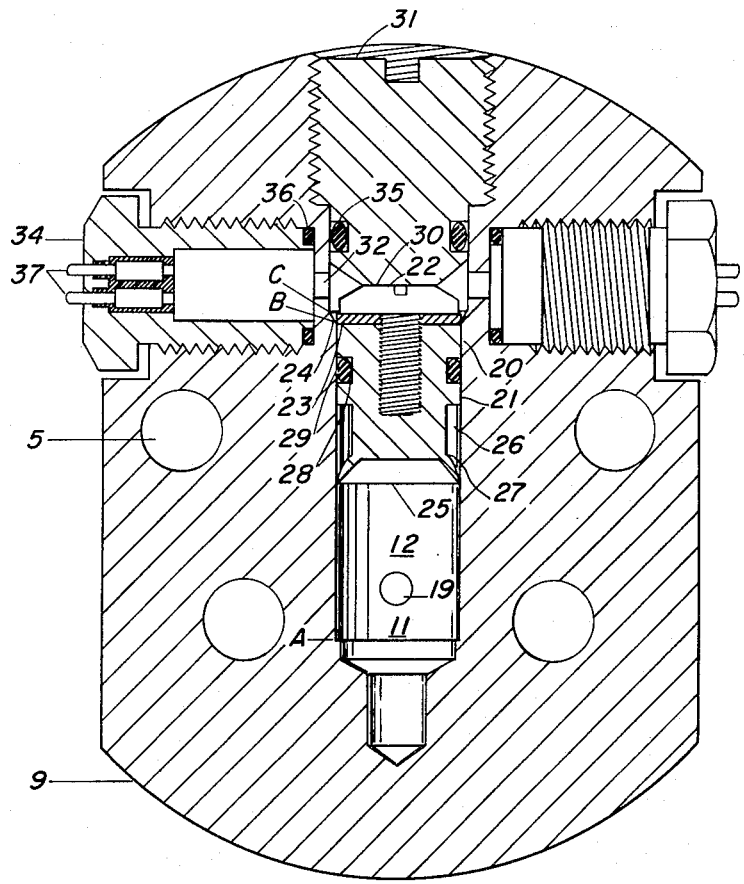
Fig. 2
WITNESSES:
Roy H. Smith, Jr.
Henry Heyman
INVENTOR.
L. Bruce Wilner
BY

United States Patent Office 2,937,654
Patented May 24, 1960

2,937,654
TUBE SHEARING VALVE

L Bruce Wilner, Los Alamos, N. Mex., assignor to the United States of America as represented by the United States Atomic Energy Commission Filed Feb. 10, 1958, Ser. No. 714,448

4 Claims. (Cl. 137—68)

The invention herein disclosed relates to fluid flow valves, and particularly to valves for controlling the flow of fluids under very high pressures. The word "fluid" is used in the generic sense to encompass both liquid states and gaseous states.

In the operation of propulsion systems for rockets, torpedoes, jet engines, gas turbines and the like, it frequently becomes necessary to provide a valve which will permit the flow of a fluid under high pressure in accordance with a pre-arranged sequence of events. Until the occurrence of a certain event which should precede the fluid flow in such a sequence, which event may be a check that the system has been prepared for the fluid flow, it is necessary that the fluid container be absolutely leak-tight, as the fluid involved is frequently of an explosive or corrosive nature. Furthermore, where the proper operation is closely dependent on pressure, even a small leak may cause malfunctioning, especially where the fluid must be stored for considerable periods of time. Some of the fluids involved are also quite expensive, and even the loss of a cubic centimeter at standard temperature and pressure may represent a large economic waste.

In addition to the foregoing consideration, it is highly desirable to be able to assemble a valve of the type discussed directly to the container of the high pressure fluid in such manner that there is no opportunity for leakage during such assembly and so that disassembly can also be accomplished without leakage, both without the interposition of any other valves or other flow-controlling mechanisms. In this manner assembly and disassembly can be accomplished with a minimum of equipment and without the hazards attendant on the release of explosive or toxic fluids. The pressure of the contained fluid also remains constant, eliminating the necessity for delicate additions to restore the proper pressure.

It is also of considerable advantage in an opening type valve to provide a combination of parts so disposed that there can be no accidental blocking of the flow ports once the valve has been operated to connect them and where no extra structure or special design and relationship of main members is necessary to insure against such blocking. In most prior art valves the flow ports are connected by the movement of a driven member, usually a piston or plug, from a position wherein it blocks one or both of the flow ports to a position wherein both ports are unblocked and are connected to a common chamber.

In such prior art valves, a reverse movement of such driven member would re-block one or more of the ports, restricting or completely halting the flow. Consequently, much of the design effort is spent on detents to restrain the piston or plug to an open-valve position, involving either extra structure or a cooperative relation between the piston and the walls restraining it whereby the actuated piston is jammed into such walls so tightly as to form a metal-to-metal seal, from which it can be extracted only by expensive and wasteful machining techniques. A valve in which the ports are opened by the driven member in such manner that the ports cannot be closed by such member in any of its positions from fully actuated to fully retracted eliminates the need for such extra structure or cooperative relationship and makes possible a simple disassembly of the operated valve.

A valve having the characteristics described is also useful in many experimental and manufacturing techniques, even when the fluid involved may be non-explosive and non-toxic. Neutron source tubes, as one example, must be outgassed to an extremely low vacuum to remove all possible air from the interior, after which deuterium or tritium gas is added to a predetermined pressure. A valve of the type described can be used for such filling by connecting a battery of such tubes to a central tank at the proper time with a high degree of accuracy. It may similarly be used to fill electron tubes operating on inert gases at much higher pressures.

Various prior art devices have been considered to serve the functions described, but none were found satisfactory. In the explosive poppet valve disclosed by Lubbock in U.S. Patent 2,405,439, the piston operates against the pressure of the fluid being transferred during the entire opening operation. This not only requires a higher piston driving pressure than would be necessary if the high pressure fluid container were absolutely sealed prior to valve operation, but involves the leakage hazard referred to above plus additional valves during assembly and disassembly. Lubbock's detent means, involving the lateral extrusion of detent slugs into recesses in a piston skirt by the force of the piston on an anvil of soft metal, requires considerable force at the end of the stroke and consequently involves the possibility of a failure to function if the resisting pressure of the controlled fluid is larger than expected, as in a surge, or if any of the detent parts do not cooperate perfectly. In this event, the piston would be raised back to its closed position to close the valve and the valve would not function as intended. In the valves of the present invention, dependence on such complicated detent means is eliminated.

The valve disclosed by Mathisen in U.S. Patent 2,557,448 is essentially a spring driven shut-off valve in which an explosive force is used merely to release a compressed spring. This type of valve was not considered adaptable for the opening type functions under discussion, as it suggested no means for providing the leak-proof system required in an opening valve of the type embraced in the present invention. Furthermore, Mathisen's valve requires special structure and design to keep the drive member in a particular position after the initial operation.

The type of valve disclosed by Daudelin in U.S. Patents 2,777,455 and 2,796,074, were also considered, but found wanting in that they require the source of high pressure fluid to be flow connected to the valve prior to the opening operation of the plug type piston, with the leakage and accessory valve objections referred to above. Daudelin's valves also require the use of special structure to keep the driven member in a particular position after its initial valve-opening movement.

Other types of valves have also been considered, some of which were substantially leakproof in themselves, but all of which were open to the objection that they required a fluid connection to the fluid storage tank prior to operation and thus involved either the possibility of leakage during assembly and disassembly or the use of an auxiliary valve between the opening type valve under consideration and the storage tank. All such valves were also objectionable in requiring either special structure or design to restrain the piston or other driven member in a particular position after its valve-opening movement, It is therefore an object of this invention to provide a valve for connecting a sealed fluid container in fluid flow relationship to one or more other fluid containers, which may also be sealed prior to actuation of the valve.

It is another object to provide a flow actuating valve which may be directly assembled to a fluid container without the use of auxiliary flow-controlling means and may also be directly disassembled therefrom prior to operation with zero leakage.

It is a further object to provide an opening type valve in which the driven member is actuated to connect two or more containers in fluid flow relationship on its opening movement and may thereafter occupy any position ranging from fully actuated to fully retracted without interfering with such fluid flow relationship.

It is a further object to provide an opening type valve in which no separate structure is required to maintain the driven member in a particular position or range of positions after it has been actuated to connect two or more containers in fluid flow relationship, and no co-operative relation between such driven member and any other part of the valve is required to maintain such driven member in such position or positions.

It is another and further object to provide a valve for joining in fluid flow relationship two or more containers, at least one of which contains a high pressure fluid, in such manner that the driven member of the valve need not work against the high pressure of such fluid.

The foregoing objects are achieved in the valves of the present invention by maintaining the fluid to be transferred entirely surrounded by a material wall and by breaching this wall at the prearranged time by the operation of the valve. This is accomplished by fitting the fluid container with a tube having a closed outer end and of such size and shape as to pass through an appropriate opening in the valve, terminating at its closed end in a position in the path of a cutting edge mounted at the bottom of the valve piston as it is propelled through the bore or chamber of the valve. The fluid container is then filled to the desired pressure and sealed against leakage at all other openings by conventional methods. To make the system as permanently leakproof as possible, all openings, including that surrounding the joint between the aforementioned tube and the fluid container, may be welded. The container will then be leakproof except to the extent that the fluid diffuses through such a material barrier, which is minor and can be reduced to an infinitesimal amount by proper design.

The valve is then actuated by an external impulse to project its piston against the tube, shearing the closed end and permitting the fluid to flow out. By properly shaping the portion of the piston which contacts the tube to form a cutting edge, the tube end is sheared off cleanly and without any appreciable crimping effect which would restrict the bore. If desired, the containers into which the flow is directed may be similarly provided with closed end tubes so placed as to be sheared by the action of the valve piston. In the alternative, such containers may be connected in a conventional manner in fluid flow relationship with the valve prior to operation, e.g., if the container to be filled must be vacuumed prior to filling.

Where it is unnecessary to restrict the piston to any particular post-operative position, clear flow channels are insured by bringing such tubes and flow channels into the bore near its bottom and by machining recesses or holes or both in the bottom portion of the piston to provide such flow channels for all piston positions below the cutting position and for all higher positions in which a portion of the piston body extending below its cutting edge lies between the flow ports. For any higher position, the flow channel would then be established through the entire cross-section of the bore. For operations where it is necessary to restrain the piston to a predetermined post-operative position, for reasons other than limitations inherent in the valve, e.g., where only a small amount of fluid is to be transferred and close control of pressure and volume of flow demand that the volume of fluid within the valve be known accurately in advance, a simple detent is provided to restrain the piston to a position at or near the end of its stroke and the flow channel means are similarly provided for this and any lower positions.

Figure 3:
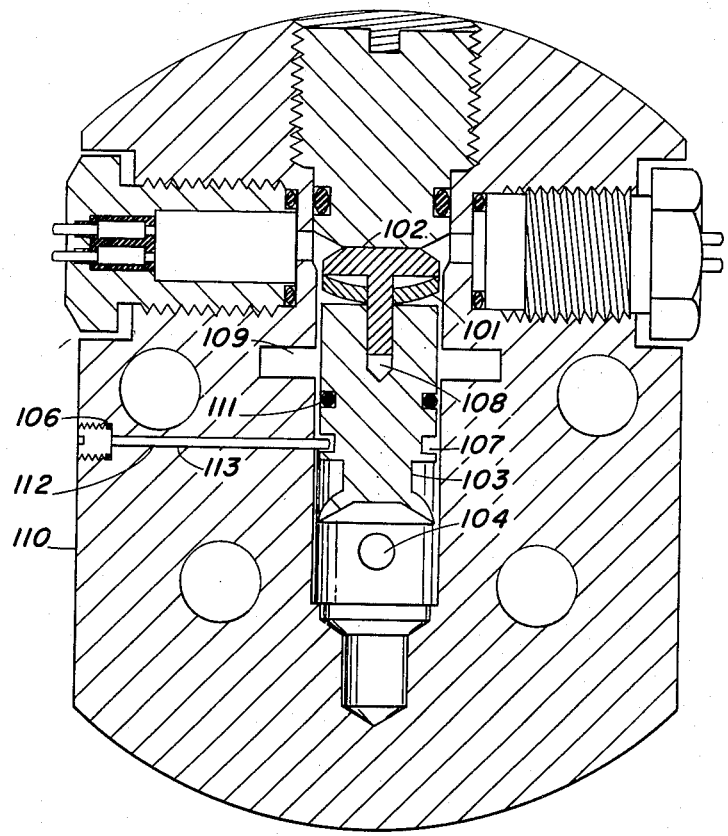

The present invention may be more clearly understood by reference to the attached drawings, in which Figure 1 is an elevation of the preferred embodiment of the present invention, shown attached to a pressure vessel which may contain a gas under high pressure, partially sectioned to show greater detail, and Figure 2 is a front view of the same embodiment sectioned on line A—A of Figure 1, and Figure 2a is a partial view of a modification of the embodiment shown in Figure 2, and Figure 3 is a cross section along the same line of an alternative embodiment of the present invention, in which a positive detent means is provided for the valve in its operated position.

Referring now to Figure 1, the valve indicated generally as 3 is shown mounted on the shoulder 2 of pressure vessel 1 by socket head cap screws 4 passing through mounting holes 5 in the valve body. Extending from pressure vessel 1 and shown welded thereto at 6 is tube 7. The tube extends through opening 8 in the valve body 9, terminating at 10 in the lower portion 11 of the valve bore 12, the latter extending from A to B in Figure 2 with a uniform cross section. The O-ring 13 in recess 14 provides a seal against leakage after the fluid flow through the valve has been established. This means has been found to provide a leakproof seal for the particular purpose for which the valve was used, the transfer of a gas from one container at about 5000 p.s.i. to a second container at atmospheric pressure in about 10 seconds, but like other gasket seals is open to the objection that it may begin leaking after long usage or long aging of the O-ring. For such applications, a permanently leakproof seal may be provided by welding, brazing or soldering, e.g., by mounting valve 3 with an air gap between itself and pressure vessel 1, thereby providing the necessary space to weld tube 7 to valve body 9. Such a weld, of course, destroys the feature of easy connecting and disconnecting, but may be necessary where leaktight joints are essential.

At the left in Figure 1, tube 15 is shown connected to the valve through the opening 16 by high pressure connector 17, to which tube 15 is welded or soldered, and by metal gland 18, which is thread connected to the valve in opening 16. The tube 15 is shown crimp sealed at its end 19 inside the valve bore lower end 11, though it can be left open and terminated short of the bore. Tube 15 can also be welded, brazed or soldered directly to valve body 9 to provide a permanently leakproof seal, at the expense of the previously mentioned feature of ease of connecting and disconnecting. Connector 17 and gland 18 could thus be eliminated and opening 16 made correspondingly smaller, or the welds could be made between gland 18 and valve body 9 and between gland 18 and connector 17.

Turning now to Figure 2, a sectional front view on the center line of the piston bore 12, line "A—A" of Figure 1, the details of the valve piston indicated generally as 20 and of the actuating mechanism can be more clearly understood. Piston 20 consists of a body portion 21 closely fitted in slidable relationship with the valve bore 12, a copper ring 23 of a slightly greater diameter than the body portion 21 and capable of fitting in the valve bore 12 only by a force fit, and a machine screw 22 securing the ring 23 to the piston body 21. In the open position depicted, the piston 20 is secured in the upper part of the bore against accidental closing by gravitational forces, shock loading, etc., by the engagement of the ring 23 with the wall of the upwardly flaring frusto-conical cavity 24, said cavity defining a common passage with the bore 12 and extending from B to C in Figure 2.

The body portion 21 is machined to provide a circumferential cutting edge 25 in its bottom plane and a circumferential slot 26 around its girth just above such cutting edge. The curved body portion 27 between the cutting edge 25 and the slot 26 has also been machined to provide a somewhat reduced maximum diameter to prevent marring the finish of the bore. Body portion 21 also contains the recess 28 for an O-ring 29.

Above piston 20 and touching it at interface 30 to prevent upward movement is breech block 31. To the left and right of the piston bore 11 and connected therewith by recesses 32 are a pair of propellant squibs 34, only one of which is shown in section. Both squibs 34 and breech block 31 are thread connected and sealed to the valve body 9 by anti-leak means which include O-rings 36 and 35, respectively, and thread cement (not shown). Each squib contains 175 milligrams of ball powder and a standard primer, together with a bridge wire internally connected across the electrical terminals shown protruding as 37 from each squib. Terminals 37 are conductively connected by wiring not shown to the plug connector indicated generally as 38 in Figure 1. A control cable, not shown, leads from the plug connector to a fire control circuit.

The embodiment shown in Figures 1 and 2 is operated by an electrical impulse from the external firing circuit to detonate the propellant squibs 34. Either squib is sufficient to operate the valve, two being provided in the event one fails to fire. The valve body 9 is sufficiently strong so that it can contain the firing of both squibs without rupture. The piston 20 is forced down by the explosive pressure, force fitting the ring 23 into the valve bore 12. The piston descends to cut off the ends of tubes 7 and 15, dropping them into the bottom of the bore. At the end of its stroke, the piston is halted by contact of the cutting edge 25 with the bottom shoulders of the bore. If desired, a protective disc or ring of a soft metal such as lead (not shown) may be provided at the bottom of the bore to prevent dulling of the cutting edge 25. In the alternative, the piston may be provided with a body portion of reduced diameter projecting below the circumferential cutting edge and striking into a correspondingly deeper bore to absorb the stroke-halting impact.

Note that in this embodiment, any venting of the explosion gases is deliberately avoided, both to utilize their high pressure during the downward stroke of the piston and to serve as a buffer after such stroke, acting together with the force fit ring 23 to prevent the pressure of the fluid being transferred from prematurely forcing the piston back to its starting position.

With the piston at the bottom of the bore, the circumferential groove 26 on the bottom periphery of the piston is lined up with the tube openings 8 and 16 and the high pressure fluid from pressure vessel 1 flows freely around such groove and through tube 15.

During such flow, a seal is maintained to prevent the intermixture of the flowing gas and the explosion gases by the joint effect of O-ring 29 and the force fit of ring 23 in the bore. Either of these have been found to be effective by itself, and together they eliminate even trace quantities of leaks, as indicated by the most sensitive detection apparatus.

The particular embodiments shown in Figures 1 and 2 have been designed to withstand operating pressures in the controlled fluids of the order of 3–5000 p.s.i. for times of the order of seconds, by the end of which the fluid transfer has been accomplished and the valve is no longer in use. In tests they have withstood pressures of 10,000 p.s.i. for periods of one minute before the piston backed up. In such tests the bore was 0.50 inch in diameter by 1.3 inches high, the body being of stainless steel, and the copper ring was 0.520 inch in diameter by .030 inch thick.

At this point attention is directed to the fact that such reverse piston movements have no effect on the proper operation of the valve, as the flowing gas does not flow longitudinally past any part of the piston length, as is true of many prior art valves. Thus the reverse piston movement cannot block the flow of gas by closing any orifice at the top of the piston. Even if the piston should be backed up and stopped at the point where the portion 27 faces the tube openings 8 and 16, the flow would be only slightly curtailed, as portion 27 has been designed with a curved section to prevent blocking. Any such blocking can also be prevented by other means, for instance by providing transverse passages through portion 27, which would permit making portion 27 parallel to the bore wall. The only effects of pushing the piston completely back to its starting position, which can happen only after the explosion gases have had time to cool and fall off in pressure, are to increase the volume of the valve for the flowing fluid and to force the piston ring 23 back to its starting position in the frusto-conical cavity 24, thereby considerably reducing its effectiveness as a seal. However, as stated above, O-ring 29 is effective to prevent leakage in and by itself. Any trace amounts which leak past it can no longer create an explosive hazard, as the initially hot explosion gases have cooled to reduce such a hazard. Furthermore, there is no longer any risk that the explosion gases will flow down along the walls of the bore to contaminate the fluid being transferred, as the positive pressure positive differential is from the bottom of the bore to the top. The thorough sealing means used in assembling squib valves 34 and breech block 31 prevent even trace quantities of leakage to the outside from the space above the piston and the volumes occupied by the squib valves and the breech block.

The modified embodiment shown in Figure 3 differs from the preferred embodiment of Figures 1 and 2 only in the detent and the means used to hold the piston in a starting position. In Figure 3 this consists of a conical washer 101, radially slotted to facilitate flattening and expanding. This washer may be made of any fairly strong, fairly ductile material such as stainless steel. When the squib propellants are exploded in the space above button 102, the force of the charge is transmitted through button 102 and washer 101 to piston 103. The washer 101 is prevented from flattening and expanding by the wall of the bore. As the plunger assembly (101, 102 and 103) moves downward it first shears off pin 112, held in recess 107 in the piston and opening 113 in the valve body to hold the piston against gravity and shock loads; it then shears the tubes extending into the valve on a level with opening 104, thereby opening the fluid flow channel. After such shearing action the washer 101 moves into annulus 109, where it flattens and expands to a diameter greater than that of the main bore. Gas pressure on button 102 forces the button into recess 108 and accomplishes the flattening of washer 101. Sealing of the fluid flow channel is accomplished by O-ring 111 between piston 103 and valve body 110. Return upward of piston 103 is prevented by washer 101 which has been expanded by flattening to a diameter greater than that of the bore above it. The gases of the propellant charge may be vented from annulus 109 or not, as desired. O-ring 106 prevents leakage past shear pin 112, but the threaded shank of the shear pin may be welded to the valve body, if considered necessary to obtain a permanently leakproof joint. The parts of the embodiment shown in Figure 3 which bear no reference numerals are identical to the corresponding parts shown and described for Figure 2. The embodiment of Figure 3 affords a means of restricting the maximum volume of fluid under control within the valve to a predetermined quantity and a means for venting the explosion gases after the valve-opening stroke of the piston.

It is to be noted that any of the embodiments shown are operable in any poistion—the vertical position shown, horizontal, oblique, or even a reverse of that shown, i.e., with the cutting edge 25 pointed up. It is also possible to disassemble each valve shown quickly and easily. It is partly for the latter reason that the piston shown in Figure 2 is initially inserted so that the ring 23 rests in the walls of the frusto-conical cavity 24 rather than being force fitted at the outset, as by eliminating such frusto-conical portion and extending the uniform bore upward or by increasing the thickness of the head of machine screw 22 so that the ring 23 is forced into the bore 12 in the initial position of the piston, as showbn in Figure 2a. With the ring in the narrowest portion of the valve bore, assembly can be accomplished with only a fair amount of difficulty.

Many modifications of the above-described embodiments will be apparent to those skilled in the art, particularly in the detent means and the means for preventing either post-operative retraction of the piston or the flow of gases between the space above the piston and the space below the piston. The copper material used to obtain the force fit with the bore was chosen because of its softness relative to the stainless steel valve body to prevent seizing and galling and could, of course, be replaced by many other soft metals or alloys. It is also possible to use a one piece piston in which the ring and screw shown are replaced by a shoulder of the larger diameter of the ring, such shoulder either being welded to the body or forming an integral part of the body, machined from a single blank. The arrangement shown is simple to assemble and affords greater flexibility in choice of materials. Such design considerations are well-known in the art and require no elaboration here.

If it is desired to secure the piston permanently in place after its opening movement and to provide a permanent seal against leakage past the piston body, it is a simple matter to provide a metal-to-metal seal between the piston body which cannot be broken except by extremely high forces, usually involving a re-machining of the bore. This can be accomplished, for instance, by increasing the thickness of the copper ring relative to the length of the bore, by using one or more oversize shoulders of sufficient axial length integral with the piston body or one or more rings fitted into appropriate grooves thereon by hot fitting techniques, a plurality being of some possible advantage in forestalling wobbling of the piston. It can also be accomplished by tapering either or both bore and piston, or more simply by providing a tapered shoulder on the bore and a corresponding but slightly larger tapered shoulder on the piston. The strength of the explosive charge necessary to drive the piston into such complete seals must be increased somewhat, but all of these considerations lie within the skill of the art. These means for restraining the piston after its tube-cutting stroke are not considered necessary to the present invention, as the embodiments disclosed are independent of the piston position in maintaining the flow channels established in the opening stroke and also provide adequate means for preventing leakage past the piston body. They are mentioned only to indicate that the tube shearing feature of the present invention is adaptable for use in a wide variety of structures other than those illustrated by the drawings.

One novel aspect of the present invention lies in the concept of using the valve which is to connect two or more containers in fluid flow relationship to accomplish the additional function of unsealing one or more of such containers. This, too, can be accomplished in various ways which will now be apparent to those skilled in the art. The particular means disclosed herein for accomplishing such unsealing action offer several advantages over such known alternative methods. In the disclosed cutting of the tube by a substantially transverse, right-angle motion of the cutting edge, the ends are clipped off neatly and with smooth edges, exposing the full bore of the tube. In the embodiments illustrated, such ends fall into the broaching and boring recesses below the bore proper and thus can do no harm; however, in any other orientation of the valve the sheared ends can cause no damage, as they cannot conceivably block any flow parts, nor can they interfere with the piston operation. In addition, the number of tube ends which can thus be sheared off in one piston stroke is unlimited.

By contrast, a possible alternative is the piercing of the end of a tube or diaphragm, either with a cutting edge or by drilling, by advancing the piston or other driven member in a direction essentially parallel to the tube axis. Such means are not as reliable in forestalling the possible blocking of flow channels, as the tube end or diaphragm thus pierced, whether or not fully removed, must remain present as a possible source of trouble, usually in the flow channel itself and generally upstream, together with ragged edges in the unremoved part of the diaphragm. The only technique for definitely removing such a source of trouble would be to cleanly remove a piece of the tube end with the piston and have the piston carry the cutout to a region removed from the flow channel and hold it there, but this technique would require the inclusion of means for restraining the piston after its opening stroke, indicated above to be unnecessary with valves of the type disclosed herein.

Such a structure would also be limited in the number of sealed tubes it could join together in the opening stroke of the piston. Only one such sealed tube could thus be opened, as operation with one or more diaphragms built into the valve to join more than one container in such unsealing operation would require the additional containers to be flow connected to the valve prior to operation.

While boring or drilling means such as the rotating of a shank having an expansion bit mounted thereon might conceivably be used to replace the piston of the present invention, this substitution would not be completely satisfactory. A fixed, threaded structure would have to be provided to accomplish axial advancement of the shank by engaging mating threads thereon in the manner of a screw and nut, and motor means for rotating such shank would be necessary. If such motor or equivalent were located outside the valve, the leakage problem imposed by turning the shank through the wall of the valve in a combination rotary-linear motion could never be completely solved. Location of the motor means inside the valve body would eliminate such leakage, but would make the valve unduly large and create an explosive hazard in those cases where the fluid being transferred could be set off by an electrical spark. Such a system would also have an inherent time lag much longer than that of the embodiments illustrated.

It is here to be noted that, although the embodiments shown depict two tubes entering the bore at substantially the same level for simultaneous shearing, the invention is not limited thereby. Such tubes may enter at different levels and the piston cutting edge shaped for simultaneous cutting, or the cuts may be made in sequence. Although the first cut may decelerate the piston somewhat, this will have no deterrent effect on the subsequent cutting action, as no reliance is placed on shock loading for such action. The valve has been designed to operate solely on the pressure of the explosion gases, and will in fact accomplish sequential shearing cuts on several tubes even when the piston starting piston is one with the cutting edge in contact with the first of such tubes at different levels or with all tubes at the same level for simultaneous shearing. When the two tubes shown in the preferred embodiments of Figures 1 and 2 are of copper and are 1/8" O.D. by 1/16" I.D. and are sheared simultaneously, a steady force of 600 pounds is required. The squib propellants described earlier provide a force of 2000 pounds to accomplish the shearing.

Coupled with the novel feature above mentioned is the disclosure herein of the arrangement of parts relative to the flow leads from the containers to be connected whereby the importance of a post-operative retractive motion of the piston is minimized. In many prior art devices, e.g., Lubbock, supra, such a motion would be fatal to the desired operation, as a retracted piston would close the port provided for flow. In the open position of such valves, the fluid under control passes along the length of the piston and through an opening uncovered by the piston in its opening movement. Accordingly, the emphasis in such devices is on the detent means used to hold the piston in its open position.

By contrast, the present invention utilizes an arrangement of parts whereby all fluid ports are flow connected at all times after the opening stroke of the piston, irrespective of the piston position. As pointed out above, the force fit ring and O-ring on the pistons in the embodiments shown are largely provided to seal off the explosive gases above the piston and the flowing fluid below the piston. As also pointed out heretofore, this seal is maintained leakproof for flowing gas pressures of 10,000 p.s.i. for periods of one minute, during which the piston was gradually forced back up. It was also pointed out that the seal can be made permanently leakproof with the piston fully retracted by such means as eliminating the frusto-conical portion of the bore and extending the narrowest portion of the bore upwards.

This can also be accomplished by various other means, e.g., mounting one or more rings at lower positions, in grooves on the piston body, so that they are below the frusto-conical portion of the bore at all times. By such means at least one ring, in the initial position of the piston (fully retracted, against the breech block), would already be force fitted between the piston and the bore wall, to retain such fit and consequent sealing effect at all times and positions. This might be desirable, for instance, where the fluid flow at high pressures is to be maintained for prolonged periods and where minor leakage of the flowing gas to the space above the piston may create a spontaneously ignitable mixture, or where the fluid under control, after a short initial period in which its pressure is higher than that of the explosive gases, rapidly falls off in pressure to one lower than such gases. The only sacrifice required in such a modification is that of easy disassembly of an installed but unoperated valve, as the valve must originally be assembled with a force fit of the ring between the piston and the bore wall.

The twice-mentioned pressure of 10,000 p.s.i. is not to be considered a limitation on even the particular design of the embodiments shown, as the ultimate limit for such design has not be determined. Designs based on pressure and time limitations are considered to be well-known to those skilled in the art.

Other methods of propelling the piston may also be used, and the invention herein described is not limited to use with an explosive actuated valve. Spring propulsion may be used, for instance, or other mechanical or electro-mechanical means may be substituted, or even compressed gas energy may be utilized. While springs suffer the relative disadvantage of providing small amounts of energy per unit volume displaced, they do offer the advantage of freedom from explosion gases which must be sealed off from the fluid being transferred. In such cases there need be no precautions taken to provide a seal about the piston or its equivalent, as there is no explosive hazard and no source of contamination for the flowing gas. In addition, with the entry and exit ports all located at the bottom of the bore as disclosed herein and with a piston or equivalent cutting means shaped as disclosed herein to prevent the blocking of such ports, the location of the piston or other means carrying the cutting edge, after the tube cutting operation, is immaterial. The piston may remain at the bottom of the bore, be forced back to its initial position at the top of the bore, or occupy any intermediate position without interfering with the free movement of the controlled fluid. It is, of course, recognized that some additional structure or mechanism must be provided to release the energy of the spring at an accurately predetermined time, e.g., retraction of a retaining pin or plate by a servomechanism.

It is also recognized that in many applications of the disclosed invention, the fluid to be transferred will not form explosive mixtures with the explosion gases, where an explosive propellant is used, and at the same time contamination of the controlled fluid by such gases presents no problem, e.g., where only the potential energy of compression is to be utilized or where the "dirty" explosion gases will not interfere with a combustion process utilizing such fuel. In such cases also, the sealing means around the piston or other cutting-edge-carrying device may be dispensed with and the explosive propellant means shown in the drawings may be used, the tight sealing means about the piston being modified so that it serves only to keep the piston in its proper initial position to prevent premature operation. This may be done solely by orientation, i.e., keeping the piston in a position where gravitational forces will not cause it to complete its stroke, by a friction type split piston ring held in place in a groove in the piston, a spring-driven plunger operating in a socket on the piston, crimping on the piston wall, or other conventional means.

Likewise the shape and size of the cutting edge, shape and location of the flow passages and tubes, and the shape and size of the bore may be varied within considerable limits without departing from the spirit of the present invention. For instance, a right circular cylindrical bore or chamber has been shown in the drawings as a matter of convenience, but such chamber need not necessarily be circular and may be slanted; all that is necessary is that the walls of such cylinder guide the piston in its stroke to permit the cutting edge to contact and cut the tube ends. With the freedom from explosive gases in the alternative structures alluded to above, even a guillotine-like structure operating in slot guides in the bore wall becomes possible, so long as it is designed to strike the tubes with sufficient force, whether solely by its free fall force or aided by propulsion means, to accomplish its intended cutting action. The cutting edge need not be unitary and continuous as shown, but may be discontinuous in one plane or at several locations, may be slanted, etc. Where circular tubes are to be sheared, it makes little difference whether a flat cutting edge is presented flat or slanted, but where a flat surface of a rectangular tube is to be cut, there is an obvious advantage in presenting a flat cutting edge on a slant, to avoid cutting an entire wall at one time, or in using a curved cutting edge for the same reason.

What is claimed is:

1. An opening type valve for controlling the flow of high pressure fluids, comprising a valve body containing a bore of substantially circular cross-section and having a top and a closed bottom end, a circular cross section opening above said bore having walls contiguous therewith and extending through the top of said valve body, at least one additional opening in the top of said valve body connected to the space above said bore, and a plurality of fluid flow passages extending from the bottom of said bore at substantially right angles to the outside of said valve body, said passages being adapted to receive fluid flow tubes and fluid flow fittings and intersecting the walls at substantially the same height, at least one fluid flow tube extending through one said fluid flow passage in sealing relationship therewith and terminating within said bore in a closed end, a piston slidably engaging the walls of said bore and being of only slightly smaller body diameter than said bore for most of its length, said piston having at its lower end a circumferential cutting edge disposed above said closed end of said fluid flow tube, said cutting edge being of smaller diameter than said piston body diameter and being defined by the intersection of an outside surface and an inside surface to form an acute angle, each of said surfaces sloping upwardly from said cutting edge and inwardly towards the center of said piston, the periphery of said piston immediately above such outside surface being recessed to provide a fluid flow channel between said fluid flow passages for all positions of said piston in said bore from the cutting position to the fully depressed position, at least one force fit sealing ring secured to the said piston near its top, said ring being of larger diameter than said bore diameter and made of a material which will not seize with the material of the bore wall when force fitted into contact therewith, said piston having a groove containing an O-ring in slidable contact with the wall of said bore, said at least one additional opening in the top of said valve body containing explosive propellant means responsive to an external impulse mounted in said additional opening at the top of said valve, a breech block plugging said opening in the top of said valve and securing said piston in an initial position at said top of said bore.

2. The valve of claim 1 in which there is a frusto-conical space between said top of said bore and said circular cross-section opening, the walls of all three spaces being contiguous, one of said force fit rings is secured to the top surface of said piston and is held in contact with the wall of said frusto-conical space by said breech block to secure said piston in an initial position at the top of said bore, and said cutting edge is located at the bottom of said piston.

3. The valve of claim 1 in which said at least one force fit ring is disposed between said piston and said bore wall when the top of said piston is in contact with said breech block and said cutting edge is located at the bottom of said piston.

4. The valve of claim 1 in which said at least one force fit ring is disposed between said piston and said bore wall when said piston is in its uppermost position and said piston body extends below said cutting edge, said portion of said piston body being recessed to provide a flow channel thereabout.

References Cited in the file of this patent

UNITED STATES PATENTS

| | | |
|---|---|---|
| 1,854,477 | McKissick | Apr. 19, 1932 |
| 2,318,005 | McGuinnes | May 4, 1943 |
| 2,515,068 | Young | July 11, 1950 |
| 2,540,322 | Christensen | Feb. 6, 1951 |
| 2,796,074 | Daudelin | June 18, 1957 |